United States Patent [19]
Heneveld, Sr.

[11] Patent Number: 6,073,942
[45] Date of Patent: Jun. 13, 2000

[54] MOVABLE DUAL CART ASSEMBLY

[75] Inventor: William R. Heneveld, Sr., Ada, Mich.

[73] Assignee: Windquest Companies, Inc., Holland, Mich.

[21] Appl. No.: 08/970,835

[22] Filed: Nov. 14, 1997

Related U.S. Application Data

[60] Provisional application No. 60/030,559, Nov. 14, 1996.

[51] Int. Cl.[7] ......................................................... B62B 3/02
[52] U.S. Cl. .................. 280/33.991; 280/33.998; 280/47.35
[58] Field of Search ........................ 280/33.991, 33.992, 280/33.998, 651, 659, 47.34, 47.35, 656

[56] References Cited

U.S. PATENT DOCUMENTS

| | | |
|---|---|---|
| 1,676,381 | 7/1928 | Callison . |
| 4,986,555 | 1/1991 | Andreen . |
| 5,322,306 | 6/1994 | Coleman ............................ 280/33.991 |
| 5,800,485 | 1/1999 | Ebbenga ............................. 280/33.991 |

*Primary Examiner*—Richard M. Camby
*Attorney, Agent, or Firm*—Rader, Fishman, Grauer & McGarry, An Office of Rader, Fishman & Grauer PLLC

[57] ABSTRACT

A dual cart assembly is provided which comprises a first cart having a frame defining a void and a second cart configured to nest within the void of the first cart. The first cart and the second cart are removably connected to each other at a joint when the second cart is nested within the void which permits limited articulation between the first and second carts so that the first and second carts can be moved as a unit facilitated by the limited articulation of the joint. Further, the first and second carts can be selectively separated for use.

19 Claims, 3 Drawing Sheets

MOVABLE DUAL CART ASSEMBLY

CROSS REFERENCE TO RELATED APPLICATION

This application claims the benefit of U.S. Provisional Application No. 60/030,559, filed on Nov. 14, 1996.

BACKGROUND OF THE INVENTION

1. Field of the Invention

This invention relates to storage carts and, more specifically, to a cart assembly formed from two or more carts and an elastomeric connector which detachably mounts the carts to one another.

2. Description of the Related Art

Medical procedures, whether complicated surgical procedures or routine office examinations, often require multiple electronic components including monitors for various vital statistics and various surgical devices. More complicated procedures, such as an ultrasound or an endoscopy, also require a black-and-white or RG13 color monitor for providing a visual readout to the attending doctor and, in some cases, to the patient.

The above-identified equipment can be used either on a single cart or on multiple carts for movement from room to room. The typical volume of required components, devices, and supplies is often too large to store on a single cart. Additionally, for the more complicated procedures requiring a visual display monitor, the equipment feeding the visual display to the monitor requires that the cart on which the equipment sits be positioned directly adjacent the doctor and patient. If the monitor and equipment are stored on a single cart, the monitor may be positioned at an awkward angle so that the monitor may not be easily or ergonomically viewed by the doctor and/or the patient. If the required components and devices are positioned on multiple carts, such as placing a monitor on a first cart so that it can be easily viewed and the equipment on a second cart so that it can be positioned adjacent the doctor and patient, it is often difficult for a single hospital or doctor's office staff member to push two or more carts to a particular location.

SUMMARY OF THE INVENTION

The invention relates to a dual cart assembly which comprises a first cart having a frame defining a void and a second cart configured to nest within the void of the first cart. The first cart and the second cart are removably connected to each other at a joint when the second cart is nested within the void which permits limited articulation between the first and second carts as they are moved as a unit and selectively separated for use.

The first cart of the dual cart assembly preferably has an upper horizontal surface located above the void and a C-shaped frame which cooperates with the horizontal surface to define the void. The second cart of the dual cart assembly preferably comprises an enclosed cabinet having multiple compartments therein. The first cart of the dual cart assembly preferably has at least one first connector and the second cart has at least one second connector which are adapted to be interengaged to form at least a portion of the joint between the first cart and the second cart.

The first connector of the dual cart assembly preferably comprises a C-shaped flange having a slotted portion therein adapted to receive a second connector. The slotted portion can have a concave surface which defines a socket. The second connector of the dual cart assembly preferably comprises a body having a proximal end mounted to the second cart and a distal end adapted to be engaged with the first connector. The distal end of the second connector, wherein the bulbous portion can be engaged within the concave surface and allow limited articulation of the second connector with respect to the first connector. The second connector can also include a handle for a user to grasp while engaging and disengaging the second connector with the first connector. The second connector is preferably pivotally mounted to the second cart.

At least a portion of one of the first and second connectors preferably comprises an elastomeric material which allows limited articulation when engaged with the other of the first and second connectors between the first and second carts. At least one first connector preferably comprises four first connectors mounted at spaced intervals on the first cart. At least one second connector preferably comprises four second connectors mounted to the second cart, the second connectors being aligned with the first connectors when the second cart is nested within the void.

The first or the second cart is preferably provided with at least one guide member which facilitates alignment of the second cart with respect to the first cart when the second cart is nested within the void. The guide member preferably comprises a plurality of bumpers mounted adjacent to the first or the second connector to facilitate positioning of the second cart with respect to the first cart.

The plurality of bumpers preferably comprises a first bumper and a second bumper of different longitudinal lengths. The first bumper preferably engages a first portion of the other of the first and second carts and the second bumper preferably engages a second portion of the other of the first and second carts to facilitate alignment of the first and second carts.

The C-shaped frame of the dual cart assembly preferably includes at least one vertical member. The second cart preferably includes a rear surface. The first connector is preferably provided on the vertical member and a second connector is preferably provided on the rear surface. The first connector is preferably adapted to interengage with the second connector to permit limited articulation of the first cart with respect to the second cart.

BRIEF DESCRIPTION OF THE DRAWINGS

The invention will now be described with reference to the drawings in which.

DETAILED DESCRIPTION OF THE PREFERRED EMBODIMENTS

Figure 1:
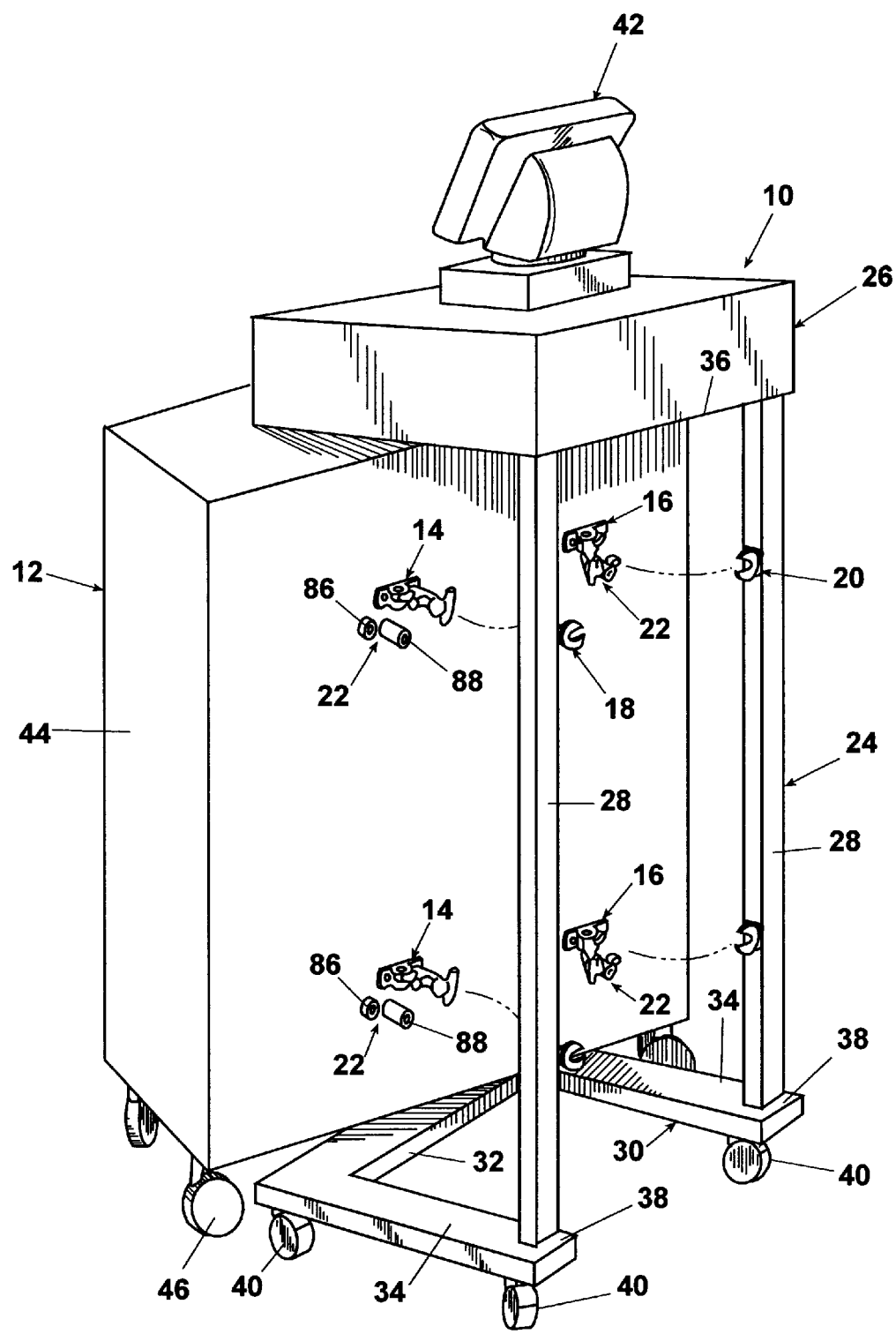
FIG. 1 is a perspective view of a dual cart assembly according to the invention showing two carts separated from one another.
Figure 2:
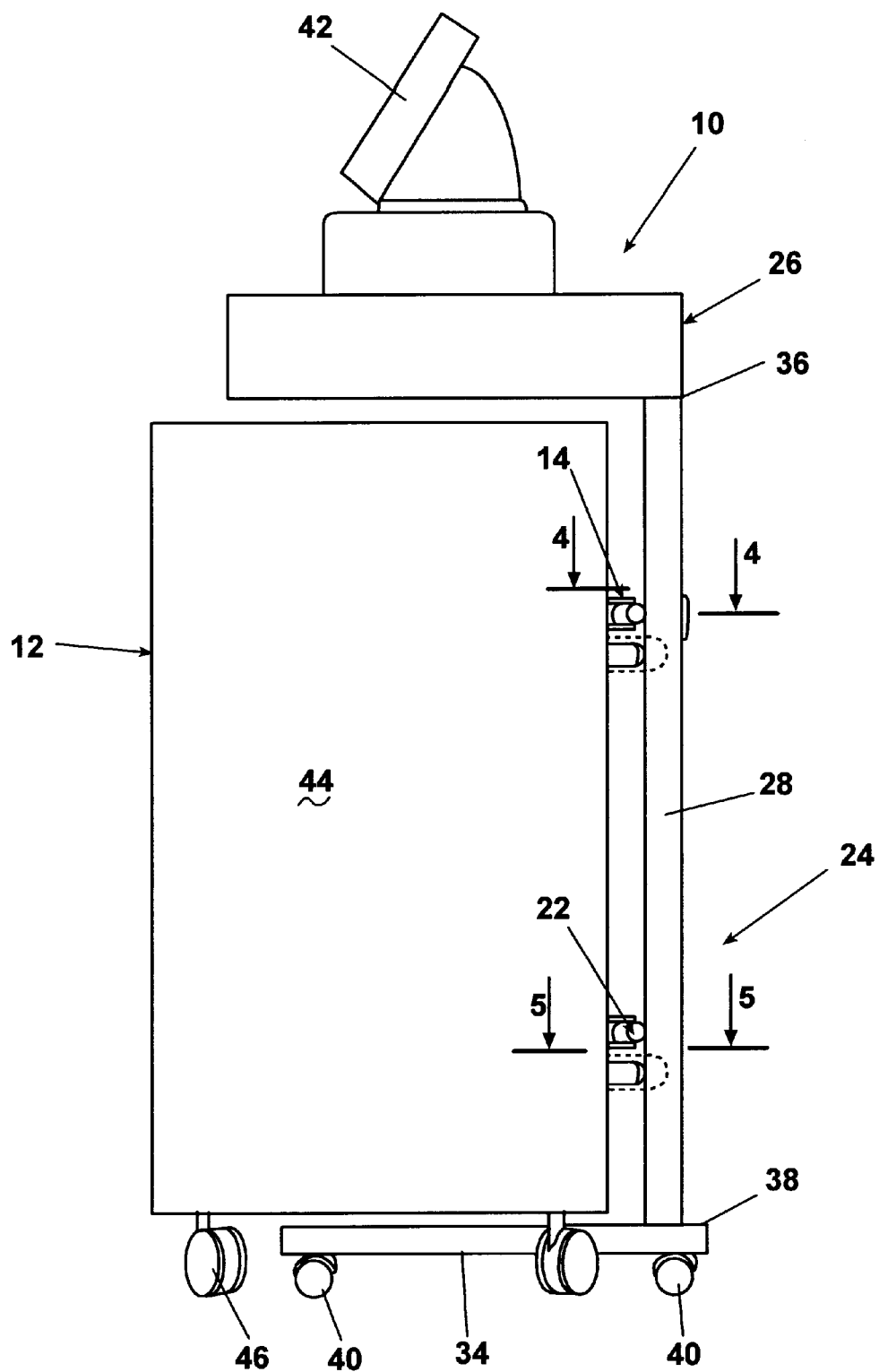
FIG. 2 is a side-elevational view of the first and second carts of FIG. 1 in an assembled position.

Referring now to the drawings and to FIGS. 1 and 2 in particular, first and second carts 10 and 12, respectively, are shown. The second cart 12 is detachably mounted to the first cart 10 by engaging second connectors 14 and 16 preferably mounted on the second cart 12 within first connectors 18 and 20, respectively, preferably mounted on the first cart 10. Proper spacing and alignment of the second cart 12 with respect to the first cart 10 is provided by guide members 22 preferably mounted on the second cart 12.

In the preferred embodiment shown in FIG. 1, the first cart 10 comprises a C-shaped body 24 defined by a top shelf 26, a pair of vertical supports 28, and a base 30. Preferably, the base 30 comprises a U-shaped member defined by a forwardly-located bight portion 32 and a pair of legs 34 extending rearwardly from each end thereof to mount to the base of the vertical supports 28. The vertical supports 28 extend between a rearward edge 36 of the top shelf 26 and a rearward portion of each leg 34. The underside of the base 30 mounts several conventional pivotable wheel assemblies such as caster wheels 40. The top shelf 26 of the first cart 10 typically supports a medical display monitor shown generally at 42. In any embodiment of the first cart 10, the body 24 defines a void adapted to receive the second cart 12. It will be understood that alternative embodiments of the first cart 10 are contemplated which can define voids of various shapes to receive the second cart 12, although only one embodiment of the first cart 10 is shown in the drawings.

The second cart 12 comprises a cabinet-type body 44 typically having shelves and drawers (not shown) mounted therein and also includes caster wheels 46 mounted to the underside of the body 44. It will be understood that the caster wheels 46 and any associated mounting brackets therewith on the second cart 10 raise the underside of the body 44 a sufficient distance so that the base 30 of the first cart 10 can be slid underneath the second cart 12 so that the vertical supports 28 of the first cart 10 are positioned adjacent the rearward surface of the body 44 of the second cart 12. The second cart 12 typically carries any required electronic components and provides storage for various other medical devices and supplies usually required with the particular electronic components stored therein.

Figure 3:
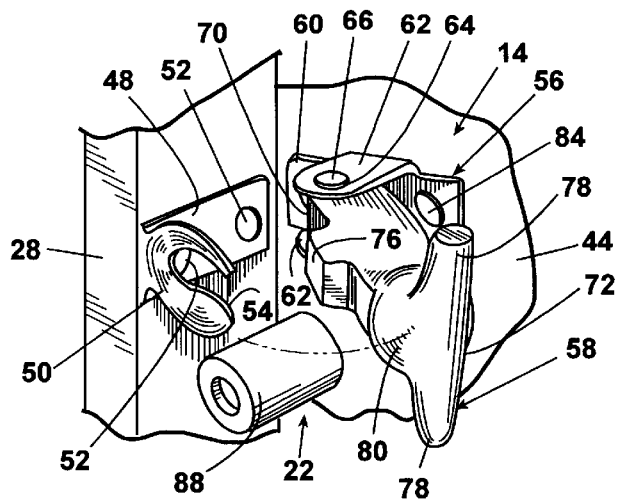
FIG. 3 is a fragmentary, perspective view of the immediate area of the coupling device of FIG. 1 with the remaining elements of the first and second carts removed for clarity.
Figure 6:
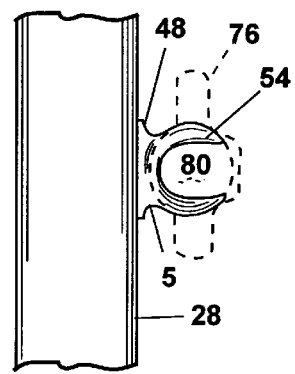
FIG. 6 is a side-elevational view of a mounting bracket of the coupling device on the first cart with the remaining elements of the invention removed for clarity.

As shown in FIGS. 1 and 2 and in greater detail in FIGS. 3 and 6, the first vertical support 28 on the first cart 10 includes at least one first connector 18, and the second vertical support 28 includes at least one first connector 20. It will be understood that the first connectors 18 and 20 are identical in all respects except that they are mounted opposite one another on interior surfaces of two vertical supports 28 on the first cart 10. Therefore, the following specification and associated drawings describe the structure of the first connector 18 with the understanding that the other first connector 20 is merely a mirror image thereof. It will also be understood that multiple sets of connectors 14–20 can be provided on the carts 10 and 12, as shown in the drawings by example by the two sets of connectors 14–20 in spaced vertical alignment.

The first connector 18 comprises a plate 48 and a C-shaped flange 50 depending therefrom. The plate 48 includes one or more apertures through which a conventional fastener, such as a screw 52, extends to mount the bracket 18 to the support 28. The flange 50 is preferably C-shaped and comprises an outwardly rounded plate having a slot 54 formed in the body thereof, wherein the opening of the slot is positioned in the edge opposite the plate 48. Preferably, the outwardly facing surface of the flange 50 is concave.

Figure 4:
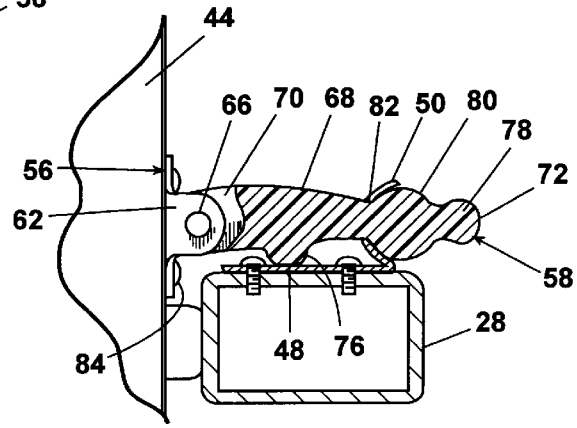
FIG. 4 is a cross-sectional view of the first and second carts taken along lines 4—4 of FIG. 2.

As shown in FIGS. 1 and 2 and in greater detail in FIGS. 3 and 4, a rear surface of the body 44 of the second cart 12 includes at least one, and preferably a plurality of second connectors 14 and 16 mounted in a spaced horizontal relationship. It will be understood that the second connectors 14 and 16 are identical in all respects except that the second connector 14 is mounted as a mirror image to the second connector 16. Therefore, the following specification and associated drawings describe the structure of the second connector 14 with the understanding that the second connector 16 is identical.

The second connector 14 comprises a mounting plate 56 and an elastomeric member 58 supported thereon. The mounting plate 56 comprises a rectangular body 60 having a pair of flanges 62 extending perpendicularly therefrom. The flanges 62 are spaced from one another and include a mounting aperture 64. Each aperture is adapted to receive a pivot pin 66 for mounting the elastomeric member 58 to the flanges 62. Preferably, the elastomeric member 58 is pivotally mounted to the flanges 62.

The elastomeric member 58 comprises a body 68 having a proximal end 70 and a distal end 72. The body 68 tapers from the proximal end 70 to the distal end 72, and the proximal end receives the pivot pin 66 in a suitable aperture (not shown). A central portion of the body 68 includes a rectangular protrusion 76, and the distal end 72 of the flange 58 includes a pair of transverse protrusions which form a handle 78. A bulb 80 is disposed inwardly of the handle 78 along the longitudinal length of the body 68 generally between the rectangular protrusion 76 and the handle 78. Preferably, the bulb 80 comprises a substantially spherical formation having a diameter greater than the body 68 and thereby defines an annular shoulder 82 at the intersection of the bulb 80 and the outer surface of the body 68.

In assembly, each second connector 14 and 16 is mounted to the rear surface of the body 44 of the second cart 12 such as by threaded fasteners 84 driven through the apertures 64 in the plate 56 and into the body 44 of the second cart 12. The member 58 is preferably formed from an elastomeric material which can be elastically deformed and which is resilient so that it will attempt to return to its original shape when stretched and allow for limited articulation between the carts 10 and 12.

Figure 5:
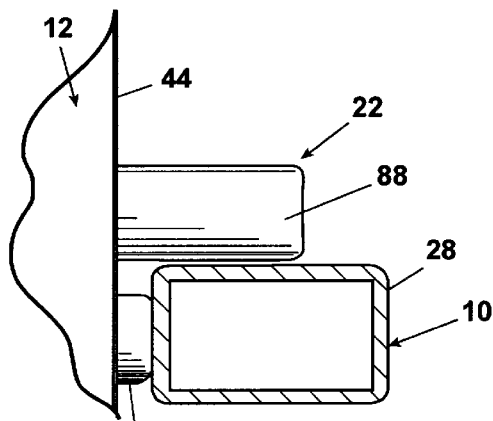
FIG. 5 is a cross-sectional view of the first and second carts taken along lines 5—5 of FIG. 2.

As shown in FIGS. 1 and 2 and in greater detail in FIGS. 3 and 5, the second cart 12 includes several sets of guide members 22 mounted in vertical alignment on the rear surface of the body 44 of the second cart 12. Each set of guide members 22 generally comprises a first bumper 86 and a second bumper 88 wherein the second bumper is generally of greater longitudinal length than the first bumper 86. The first and second bumpers 86 and 88 may preferably comprise a cylindrical mass of elastomeric material mounted to the rear surface of the second cart 12 by any suitable means such as threaded fasteners, adhesives, etc. The first bumpers 86 are mounted to the rear surface at equal intervals from each opposite vertical edge of the rear surface of the second cart 12. The function of bumpers 86 is to prevent vertical supports 28 of the first cart 10 to come in contact with the rear surface of the body 44 of the second cart 12. The second bumpers 88 are preferably mounted in horizontal alignment with the first bumpers 86 and spaced inwardly toward the centerline of the cart a short distance, preferably less than the width of the vertical supports 28 on the first cart 10. The function of bumpers 88 is to locate vertical supports 28, and therefore, the first cart 10 in the preferred location relative to the second cart 12. Additional sets of second bumpers 88 can be mounted to the rear surface of the second cart 12 in vertical alignment therewith.

The second cart 12 can be removably mounted in the void of the first cart 10 by positioning the base 30 of the first cart 10 underneath the body 44 of the second cart 12 so that the vertical supports 28 on the first cart 10 abut the first set of bumpers 86 on the second cart 12. The second bumpers 88 are preferably positioned to abut the interior surfaces of the vertical supports 28 when the two carts are mounted to one another and provide guidance to the vertical supports 28 to ensure that the vertical supports 28 properly abut the first bumpers 86. With the two carts so positioned, the elastomeric member 58 on the second connectors 14 and 16 are then engaged within the corresponding first connectors 18 and 20 by pulling on the handle 78 to engage the annular shoulder 82 within the slot 54 so that the bulb 80 is received within the C-shaped flange 50. The bulb 80 nests within the concave surface of the flange 50. The body 68 of the connectors 14 and 16 is preferably stretched when received within the mounting brackets 18 and 20 so that the resiliency of the connectors 14 and 16 tends to pull the distal end 72 of each connector 14 and 16 toward its proximal end 70, thereby providing a relatively secure mounting of the vertical supports 28 of the first cart against the bumpers 84 attached to the rear surface of the second cart 12 while still allowing a limited amount of articulation therebetween.

When the carts are mounted to one another by the engagement of the first and second connectors 14 and 16 within the corresponding first connectors 18 and 20, the first and second carts 10 and 12 can be rolled on their respective caster wheels 40 and 46 until their desired destination is reached. The second cart 12 can then be demounted from the first cart 10 by pulling the handle 78 of each second connector 14 and 16 outwardly so that the bulb 80 is no longer received within the flange 50 and then sliding the annular shoulder 82 out of the slot 54. The first and second carts 10 and 12 can then be repositioned with respect to each other, e.g., so that a doctor can view a monitor 42 resting on the first cart 10 which is connected by wiring to additional medical equipment components (not shown) resting on the second cart 12 which may need to be positioned adjacent the doctor and/or patient. This arrangement is important in certain applications, such as when the carts support endoscopy equipment used to perform an endoscopy procedure in a patient room. During this procedure, the endoscope and associated control equipment would be positioned in the second cart 12 which would be positioned immediately adjacent the doctor. The patient would be lying on his side with his back toward the doctor. The first cart 10 can be positioned a spaced distance away from the second cart 12, such as on the opposite side of the patient bed, so that it is facing the doctor. In this position, the doctor has easy access to the electrical equipment and medical supplies supported in the second cart 12 while the doctor can view the procedure on the monitor 42 supported on the first cart 10.

A significant feature of the system for mounting the two carts to one another is the elastomeric interconnection between the two carts. When the carts are mounted to one another with the elastomeric connections, the assembly can easily be wheeled down the hallway. However, when a doorway, threshold, or other inconsistency in the floor surface is encountered by the cart assembly, the elastomeric interconnection permits easy traversal of the surface. Specifically, the front wheels of the second cart 12 will pass over the threshold prior to the wheels of the first cart 10. The guide members 22 and connectors 14–20 permit limited movement of the second cart 12 with respect to the first cart 10. As the cart assembly continues to pass over the threshold, the wheels 40 of the first cart 10 will encounter the threshold, thereby moving the first cart 10 a limited amount with respect to the second cart 12. Once again, this limited movement is accommodated by the interconnection between the two carts. Finally, the second pair of wheels of the second cart 12 will pass over the threshold, and once again, the second cart 12 will move a limited amount with respect to the first cart 10. Permitting limited articulation of the two carts with respect to one another in the assembled condition permits easy movement of the cart over inconsistencies in the floor surface without excessive jarring or banging of one cart as the other cart passes over the inconsistency.

Reasonable variation and modification are possible within the spirit of the foregoing specification and drawings without departing from the scope of the invention.

What is claimed is:

1. A dual cart assembly comprising:
a first cart having a frame defining a void; and
a second cart configured to nest within the void of the first cart; the first cart and the second cast being removably connected to each other at a joint when the second cart is nested within the void, the joint configured to permit limited articulation between the first and second carts, said carts being spaced from each other by the joint, wherein said joint maintains a predetermined range of spacing between the carts to prevent abutment of the carts as they move over a ground surface having inconsistencies;
whereby the first and second carts can be moved as a unit, facilitated by the limited articulation of the joint, and the first and second carts can be selectively separated for use.

2. The dual cart assembly of claim 1 wherein the first cart has an upper horizontal surface located above the void.

3. The dual cart assembly of claim 2 wherein the first cart has a C-shaped frame which cooperates with the horizontal surface to define the void.

4. The dual cart assembly of claim 1 wherein the second cart comprises an enclosed cabinet having multiple compartments therein.

5. The dual cart assembly of claim 1 wherein the first cart has at least one first connector and the second cart has at least one second connector which are adapted to be interengaged to form at least a portion of the joint between the first cart and the second cart.

6. The dual cart assembly of claim 5 wherein the at least one first connector comprises a C-shaped flange having a slotted portion therein adapted to receive a second connector.

7. The dual cart assembly of claim 6 wherein the slotted portion is in a concave surface, thereby defining a socket adapted to receive the second connector.

8. The dual cart assembly of claim 5 wherein the second connector comprises a body having a proximal end mounted to the second cart and a distal end adapted to be engaged with the first connector.

9. The dual cart assembly of claim 8 wherein the distal end of the second connector has a bulbous portion adapted to engage with the first connector.

10. The dual cart assembly of claim 9 wherein the at least one first connector comprises a C-shaped flange having a slotted portion therein adapted to receive a second connector.

11. The dual cart assembly of claim 10 wherein the slotted portion is in a concave surface, thereby defining a socket adapted to receive the second connector wherein the bulbous portion being engaged within the concave surface allows for limited articulation of the second connector with respect to the first connector.

12. The dual cart assembly of claim 9 wherein the second connector further comprises a handle for a user to grasp while engaging and disengaging the second connector with the first connector.

13. The dual cart assembly of claim 12 wherein the second connector is pivotally mounted to the second cart.

14. The dual cart assembly of claim 5 wherein at least a portion of one of the first and second connectors is comprised of an elastomeric material which allows limited articulation when engaged with the other of the first and second connectors between the first and second carts.

15. The dual cart assembly of claim 5 wherein the at least one first connector comprises four first connectors mounted at spaced intervals on the first cart and the at least one second connector comprises four second connectors mounted to the second cart, the second connectors being aligned with the first connectors when the second cart is nested within the void.

16. The dual cart assembly of claim 1 wherein one of the first and second carts is provided with at least one guide member which facilitates alignment of the second cart with respect to the first cart when the second cart is nested within the void.

17. The dual cart assembly of claim 16 wherein the at least one guide member comprises a plurality of bumpers mounted adjacent to one of the first and second connectors to facilitate positioning of the second cart with respect to the first cart.

18. The dual cart assembly of claim 15 wherein the plurality of bumpers comprises a first bumper of a first longitudinal length and a second bumper of a second longitudinal length, the first longitudinal length being different than the second longitudinal length, whereby the first bumper engages a first portion of the other of the first and second carts and the second bumper engages a second portion of the other of the first and second carts to facilitate alignment of the first and second carts.

19. The dual cart assembly of claim 3 wherein the C-shaped frame includes at least one vertical member, the second cart includes a rear surface, a first connector is provided on the vertical member, and a second connector is provided on the rear surface whereby the first connector is adapted to interengage with the second connector to permit limited articulation of the first cart with respect to the second cart.

* * * * *

UNITED STATES PATENT AND TRADEMARK OFFICE
CERTIFICATE OF CORRECTION

PATENT NO.: 6,073,942

DATED: June 13, 2000

INVENTOR(S): William R. Heneveld, Sr.

It is certified that error appears in the above-identified patent and that said Letters Patent are hereby corrected as shown below:

Claim 1, col. 2, line 17, "cast" should read --cart--.

Signed and Sealed this

Seventeenth Day of April, 2001

*Attest:*

NICHOLAS P. GODICI

*Attesting Officer*  *Acting Director of the United States Patent and Trademark Office*